United States Patent Office 3,216,282
Patented Nov. 9, 1965

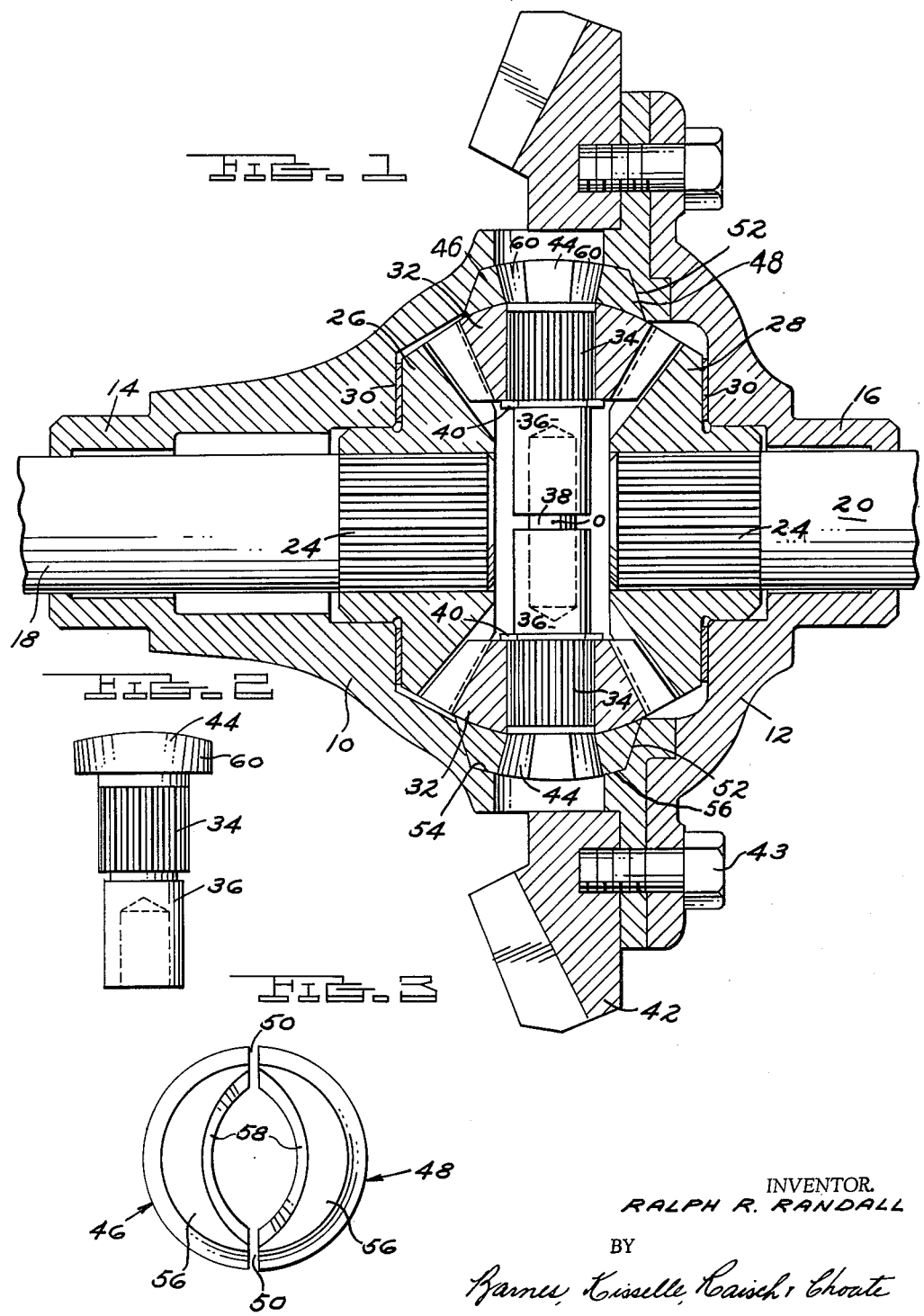

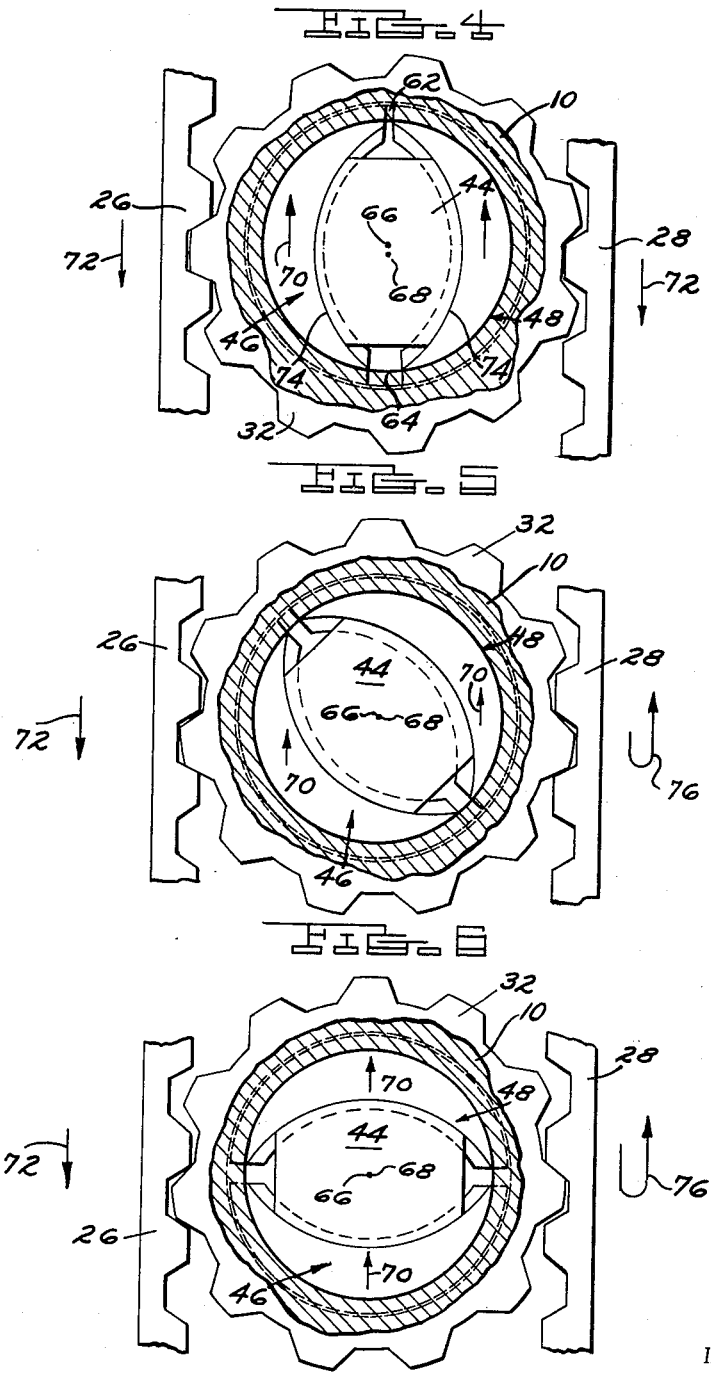

3,216,282
DIFFERENTIAL MECHANISM
Ralph R. Randall, Freeport, Ill., assignor to Dualoc
Engineering Company, Rockford, Ill., a corporation of
Illinois
Filed Aug. 2, 1962, Ser. No. 214,353
15 Claims. (Cl. 74—711)

This invention relates to a differential mechanism of the type used on vehicles.

The conventional differential ordinarily used on automobiles and trucks, for example, is a relatively efficient device for transmitting torque to the driven wheels of the vehicle as long as the driving wheels have equal traction. However, when the traction on the two driven wheels differs substantially, for example, when one wheel is on ice and the other is on dry pavement, with a conventional differential, the wheel having the lesser traction has a tendency to spin while the other wheel remains stationary. Much effort has been directed toward the solution of this problem and the "locking" type differential has evolved. However, to my knowledge, the locking differentials heretofore designed to overcome this problem have always had one or more objections. Many of the locking differentials heretofore proposed, when in locked condition, prevent wheel spinning but require too great a force to overcome the locking action for returning to free differential movement. Other differentials proposed heretofore which, while they also achieve some degree of success with respect to equal division of power to two driving wheels having unequal traction, nevertheless have presented the problem of economical manufacture.

It is an object of the present invention to provide a differential for automotive vehicles that is of economical manufacture and which at the same time is capable of delivering equal torque to driving wheels of the vehicle that are subjected to substantially different traction and yet which is designed to produce differential action freely when conditions require.

In the drawings:

FIG. 1 is a cross sectional view of a differential of the present invention.

FIG. 2 is a side view of the cam member associated with each driving pinion in the differential.

FIG. 3 is a top plan view of the cam bearings associated with the cam member illustrated in FIG. 2.

FIGS. 4, 5 and 6 are somewhat diagrammatic views illustrating the operation of the differential.

Referring to FIG. 1, a differential comprises a housing 10, the open end of which is closed by a cover plate 12. Housing 10 and cover plate 12 are provided with hubs 14 and 16, respectively, in which the wheel axles 18 and 20 respectively, are journalled. The inner ends of axles 18 and 20 have splined connections as at 24 with side gears 26 and 28, respectively. Bearings 30 are provided for taking the side thrust of side gears 26 and 28.

The side gears 26 and 28 are interconnected by a pair of diametrically opposite bevel pinion gears 32. Each pinion gear 32 has a splined connection as at 34 with a stud 36. The two stud members 36 are interconnected by a pin 38 extending axially into the adjacent ends of the stud members 36. Pinions 32 are prevented from shifting axially inwardly on stud members 36 by snap rings 40. The apparatus thus far described and including the ring gear 42 secured to the casing 10 by screws 43 is not substantially different from a conventional differential.

The present invention is directed specifically to the provision of a cam member 44 at the outer end of each stud 36 in combination with segment cam bearings 46, 48 associated with each cam member 44. The segment cam bearings 46, 48 are preferably initially formed from a circular ring which, after being machined, is cut through on a diameter to remove segments of metal indicated by the spaces 50 in FIG. 3. The outer peripheral surface of bearing segments 46, 48 is conical so that these segments have a close fit with the conical bearing seats 52 in casing 10. This conical shape of the bearing seat and bearing segments is adapted to compensate for wear. The radially outer surfaces 54 of bearing seats 52 are spherically shaped in the embodiment illustrated and the corresponding outer surfaces 56 of bearing segments 46, 48 are similarly shaped to interfit therewith. Bearing segments 46, 48 have an inner periphery of elliptical shape in horizontal section. However, in addition to being of elliptical contour, the inner peripheral surfaces 58 of bearing segments 46, 48 are conically shaped, the generating axis of the cone passing through the intersection O of the axes about which the side gears 26, 28 and the pinion gears 32 rotate. The opposed side faces 60 of the two cam members 44 are likewise conically shaped to correspond with the contour of the surfaces 58 of bearing segments 46, 48 so that the surfaces 58 of the bearing segments are at all times in coplanar engagement with the surfaces 60 of the cam members 44.

Referring now to FIG. 4, it will be observed that with the bearing structure described at the outer ends of the pinions 32, the two bearing segments 46, 48 associated with each pinion 32 can be rotated in the bearing seat 52 in opposite directions so that the opposite ends of the two bearing segments are capable of shifting toward or away from one another. In the arrangement shown in FIG. 4, for example, bearing segment 46 has been shifted in a clockwise direction and bearing section 48 has been shifted in a counterclockwise direction so that the space 62 between the ends of bearing segments 46, 48 illustrated at the upper portion of this figure is substantially less than the spacing 64 between the other ends of these bearing segments. When the condition illustrated in FIG. 4 occurs, the axial center of each cam member 44 shifts downwardly as viewed in FIG. 4 from a position where it coincides with the axial center 66 of bearing seat 52 to the position indicated at 68.

It is believed that with a clear understanding of the structural elements described above, the operation of the differential of this invention will be obvious. When the vehicle is travelling in a straight-away path, the components of the differential assume the positions illustrated in FIG. 4. The driving torque is transmitted to the housing 10 of the differential through the ring gear 42. This driving torque is transferred through the bearing segments 46, 48 to the diametrically opposite cam members 44 and pinions 32. The pinions 32 in turn transfer this driving torque to the two side gears 26, 28 by reason of the meshing relationship between the pinions and the side gears. For the purpose of illustration, the torque on the bearing segments 46, 48 is illustrated by the arrows 70 and the resistance or drag on the side gears resulting from the traction of the wheels with the ground is represented by the arrows 72. From this illustration of forces, it will be appreciated that when the vehicle is travelling on a straight-away, the two bearing segments 46, 48 associated with each pinion will shift to the position shown in FIG. 4 and the cam member 44 will drop back to the offset portion where its center is shifted to the position indicated at 68. In this position of cam portion 44 and pinion 32, it will be observed that the trailing face portions of cam member 44, indicated generally at 74, exert a wedging action against the corresponding trailing face portions of bearing segments 46, 48, tending to spread these bearing segments radially apart and thereby substantially increase the radial pressure between the trailing interengaged faces of bearing segments 46, 48 and the bearing seat 52 in the housing. This increased bearing pressure between the bearing segments 46, 48 and the bearing seat 52 in housing 10 resists rotation of pinion 32 and the pinion is thus locked in the position illustrated in FIG. 4. This locking action is enhanced by the fact that the center 68 of the cam member 44 is offset from the center 66 of bearing seat 52. Thus, in this position of cam member 44, if the latter has a tendency to rotate, it exerts a radially outward pressure against both bearing segments 46, 48 and thus further increases the friction and resistance to rotation between the two bearing segments 46, 48 and the bearing seat 52. In this condition of the differential, the driving torque on the housing 10 is positively transferred to both axle gears 26, 28. This remains true despite the fact that the two driven wheels might be subjected to widely different traction characteristics such as one wheel engaging dry pavement and the other wheel engaging wet ice. The net result is that the driving wheel having the greatest traction is positively driven and the vehicle is propelled in the locked condition of the differential illustrated in FIG. 4. The differential never permits torque to flow to one driven wheel in excess of the available traction without causing both wheels to spin or slip simultaneously.

Once the relationship illustrated in FIG. 4 is established, the differential will remain locked in this condition until such time as the external forces acting on the two driven wheels require differential action. In other words, the differential will remain locked in the condition shown in FIG. 4 until either one or the other of the axle gears 26, 28 is positively driven relative to the other such as when the vehicle is negotiating a turn or when one of the driven wheels goes over a bump, in which case, one of the wheels, by reason of its engagement with the ground surface, is positively caused to overtravel relative to the other wheel. When this occurs, the wheel which is overrunning the other, acting through its side gear, applies a torque to the pinion 32 and positively rotates the pinion. In FIG. 5, the situation is shown where the wheel associated with axle gear 28 begins to override the wheel associated with axle gear 26. Since the axle gear 28 is positively rotated by the overrunning wheel to which it is connected, a torque is applied to pinion 32 tending to rotate the pinion in a counterclockwise direction as viewed in FIG. 5. This reversely applied torque is represented as the return bent arrow 76 in FIG. 5. The torque of the overrunning wheel is thus effective to break the lock illustrated in FIG. 4. Stated differently, the torque of the overrunning wheel is sufficient to overcome the frictional resistance between the bearing segments 46, 48 and the bearing seat 52 in the casing, thus shifting the cam member 44 back to its central position wherein its center 68 coincides with the center 66 of the bearing seat 52. If the right wheel of the vehicle continues to override the left wheel, then the axle gear 28 will continue to rotate the pinion as shown in FIG. 6 and this rotation of the pinion will continue as long as the one wheel overrides the other. Thus, the necessary differential action is at all times available as required by the driven wheels.

However, as soon as the two driven wheels assume the same speed, the differential will lock in the position shown in FIG. 4 and the driving torque will be positively transferred equally to both wheels until such time as an external force is again applied to one of the axle gears. It therefore follows that with the differential of this invention, true differential action is always obtained when required and power division between the wheels remains constant, the differential delivering controlled torque to both driven wheels at all times regardless of road traction conditions. It has been established that the ratio in traction between dry concrete and wet ice is about 14 to 1. The differential of this invention will remain locked even with such a large traction ratio.

One test for determining the efficiency and operability of a locking-type differential has been prescribed by the United States Ordnance Department. In this particular test, the differential is determined to be safe and effective when it has a power division sufficient to propel the vehicle forward or in reverse over a 4″ obstacle with one of the driven wheels on wet ice and the other driven wheel on dry pavement without spinning the wheel on wet ice. In addition, the differential must be able to negotiate a turn or a corner with the freedom of a balanced gear differential of the conventional type. The differential of this invention passes this test satisfactorily.

What I claim is:

1. A differential mechanism comprising a rotatable housing forming a driving member, a pair of spaced apart axially aligned bevel axle gears in the housing at the axis of rotation of the housing, a pinion gear arranged between and meshing with the two axle gears, said pinion gear having a cam member rotatably fixed thereto, said cam member being symmetrical about the axis of rotation of the pinion, a circular bearing seat in the housing circumscribing the cam member and a pair of bearing segments closely fitted in the bearing seat and embracing the cam member, said bearing segments being generally crescent shaped with their radially inner faces in coplanar engagement with the faces of the cam member, the outer periphery of the bearing segments forming less than a full circle so that the ends of the segments are spaced apart circumferentially and are capable of shifting circumferentially in the bearing seat in opposite directions toward and away from one another while in coplanar engagement with said cam member.

2. A differential mechanism as called for in claim 1 wherein said coplanar engaged faces of the bearing segments and cam member are of conical form with the generating axis thereof passing through the intersection of the axes of the axle gears and the pinion gear.

3. A differential mechanism as called for in claim 2 wherein said inner faces of the bearing segments and the faces of the cam member are of elliptical contour when viewed along said generating axes.

4. A differential mechanism as called for in claim 2 wherein the bearing segments are of the same size.

5. A differential mechanism as called for in claim 2 wherein the axially outer surface of the pinion and the axially inner surface of the bearing segments are spherically shaped and in coplanar engagement.

6. A differential mechanism comprising a rotatable housing forming a driving member, a pair of spaced apart, axially aligned bevel gears in the housing at the axis of rotation of the housing, a pair of diametrically opposed pinion gears arranged between and meshing with the two axle gears, said pinion gears each having a cam member rotatably fixed thereto, each cam member being symmetrical about the axis of its pinion gear, a pair of diametrically opposed circular bearing seats in the housing circumscribing said cam members and a pair of bearing segments closely fitted in each bearing seat and each embracing its respective cam member, said bearing segments being generally crescent shaped with their radially inner faces in coplanar engagement with the faces of the cam member, said coplanar engaged faces of the bearing segments and the cam members being of conical form with the generating axis thereof passing through the intersection of the axes of the axle gears and the pinion gears, the outer periphery of the bearing segments forming less than a full circle so that the ends of the segments in each bearing seat are spaced apart circumferentially and are capable of shifting circumferentially in their respective bearing seats in opposite directions toward and away from one another while in coplanar engagement with their respective cam members.

7. A differential mechanism as called for in claim 6 including means for retaining the two pinion gears in axially aligned relation.

8. A differential mechanism as called for in claim 6 wherein the bearing seats are generally frusto-conically shaped, being smaller at the axially outer end thereof, and wherein the outer peripheral surfaces of the bearing segments are complementary thereof.

9. A differential mechanism comprising a rotatable housing forming a driving member, a pair of spaced apart, axially aligned bevel gears in the housing at the axis of rotation of the housing, a pair of diametrically opposed pinion gears arranged between and meshing with the two axle gears, said pinion gears each having a cam member rotatably fixed thereto, each cam member being of elliptical shape and being symmetrical about the axes of the pinions, the radially outer elliptical faces of the cam member being of conical form with the generating axis thereof passing through the intersection of the axes of the pinions and axle gears, a pair of diametrically opposite bearing seats in the housing circumscribing the cam members and a pair of bearing segments closely fitted in each bearing seat and embracing its respective cam member, the bearing segments being generally of crescent shape with their radially inner surfaces complementary to and in coplanar engagement with said opposite side faces of the cam members and the radially outer surfaces of the bearing segments being of circular shape, the outer periphery of the bearing segments forming less than a full circle so that the ends of the segments are spaced apart circumferentially and are capable of shifting circumferentially in their respective bearing seats in opposite directions toward and away from one another while in coplanar engagement with their respective cam members.

10. A differential mechanism as called for in claim 9 wherein each of the elliptically shaped cam members has its opposite ends terminating short of the ends of the major axis of the ellipse.

11. A differential mechanism as called for in claim 9 including means for retaining the pinions in axially aligned relation.

12. A differential mechanism as called for in claim 9 wherein the radially outer surfaces of each pair of bearing segments are conically shaped, having a smaller diameter at the axially outer end thereof, and wherein the bearing seats in the casing are shaped complementary thereto.

13. A differential mechanism comprising a rotatable case forming a driving member, a pair of spaced apart, axially aligned axle gears in the case journalled for rotation at the axis of rotation of the case, a pinion gear interposed between and meshing with each of said axle gears, said pinion gear having a non-circular projection thereon symmetrical about the axis of rotation of said pinion gear, a circular bearing seat in the case into which said projection extends, bearing means journalled in said bearing seat and providing a non-circular opening in which said projection is engaged to provide a driving connection between said pinion and said bearing means, said bearing means being adapted to closely engage said projection in one direction and to permit a slight lateral shifting of the projection in the opening in a direction normal to said one direction, whereby when said projection shifts laterally in said opening and the pinion is in meshing relation with the axle gears, the pinion rocks to a position eccentric relative to said bearing seat to thereby lock the pinion against rotation in the case.

14. A differential mechanism comprising a rotatable case forming a driving member, a pair of spaced apart and axially aligned axle gears journalled in the case at the axis of rotation of the case, a pinion gear arranged between and meshing with the two axle gears and having its axis normal to and intersecting the axis of said axle gears, said pinion gear having a non-circular projection extending axially thereof, said case having a bearing socket therein into which said projection extends, bearing means journalled in said socket, said bearing means providing an opening into which said projection extends, said opening cooperating with said projection to form a rotatable driving connection between said pinion and said bearing means, said bearing means being adapted to permit the projection to shift laterally in one direction in said bearing means to a position wherein the axis of the pinion is eccentric relative to said bearing socket, whereby when said projection shifts laterally to said eccentric position while the pinion is in meshing relation with said axle gears, the pinion is prevented from rotating and the axle gears are effectively locked to rotate with the case as a unit.

15. A differential mechanism as called for in claim 14 including a ring gear on the case concentric with the axis of rotation thereof and by means of which a rotating drive may be applied to the case.

References Cited by the Examiner
UNITED STATES PATENTS

| | | | |
|---|---|---|---|
| 2,918,831 | 12/59 | Wildhaber | 74—710.5 |
| 3,051,020 | 8/62 | Hartupee | 74—710.5 |

DON A. WAITE, *Primary Examiner.*